US011881201B2

(12) United States Patent
Takeda et al.

(10) Patent No.: US 11,881,201 B2
(45) Date of Patent: Jan. 23, 2024

(54) CONTROL APPARATUS, LOUDSPEAKER APPARATUS, AND AUDIO OUTPUT METHOD

(71) Applicant: SONY GROUP CORPORATION, Tokyo (JP)

(72) Inventors: Hirofumi Takeda, Tokyo (JP); Shuichiro Nishigori, Tokyo (JP); Shiro Suzuki, Tokyo (JP); Takahiro Watanabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/637,596

(22) PCT Filed: Aug. 25, 2020

(86) PCT No.: PCT/JP2020/031969
§ 371 (c)(1),
(2) Date: Feb. 23, 2022

(87) PCT Pub. No.: WO2021/044901
PCT Pub. Date: Mar. 11, 2021

(65) Prior Publication Data

US 2022/0277726 A1 Sep. 1, 2022

(30) Foreign Application Priority Data

Sep. 3, 2019 (JP) ................................ 2019-160508

(51) Int. Cl.
*G10K 11/178* (2006.01)
*H04R 1/02* (2006.01)

(52) U.S. Cl.
CPC ....... *G10K 11/17873* (2018.01); *H04R 1/025* (2013.01); *G10K 2210/108* (2013.01);
(Continued)

(58) Field of Classification Search
CPC ..... G10K 2210/1291; G10K 2210/129; G10K 11/17873; G10K 11/17881;
(Continued)

(56) References Cited

U.S. PATENT DOCUMENTS 10,757,512 B2 * 8/2020 Schnell .................. H04R 25/43
2008/0223627 A1 * 9/2008 Lacroix .................... H04N 5/04
178/18.01
(Continued)

FOREIGN PATENT DOCUMENTS

CN 101292211 A 10/2008
CN 104184721 A 12/2014
(Continued)

OTHER PUBLICATIONS

International Search Report and Written Opinion of PCT Application No. PCT/JP2020/031969, dated Nov. 10, 2020, 12 pages of ISRWO.

*Primary Examiner* — Norman Yu
(74) *Attorney, Agent, or Firm* — CHIP LAW GROUP

(57) ABSTRACT

Provided is a control apparatus that includes a tactile control section and an audio control section. The tactile control section generates, on the basis of a tactile signal for tactile presentation, a tactile control signal for driving a tactile presentation unit. The audio control section generates, on the basis of a first audio signal and a second audio signal, an audio control signal for driving an audio output unit, the second audio signal containing sound components that are in an opposite phase to sound generated on the basis of the tactile signal and generated from the tactile presentation unit.

12 Claims, 8 Drawing Sheets

(52) U.S. Cl.
CPC .................. *G10K 2210/129* (2013.01); *G10K 2210/3027* (2013.01); *G10K 2210/3044* (2013.01)

(58) Field of Classification Search
CPC ..... G10K 2210/108; G10K 2210/3027; G10K 2210/3044; H04R 1/025; H04R 2460/01; H04R 2499/11; H04R 25/604; H04R 2400/03
USPC ...... 381/71.8, 94.1, 71.1, 71.2, 13; 181/206, 181/175
See application file for complete search history.

(56) References Cited

U.S. PATENT DOCUMENTS

| | | | | |
|---|---|---|---|---|
| 2014/0079235 | A1* | 3/2014 | Lyons .............. G10K 11/17873 381/71.6 |
| 2014/0347177 | A1* | 11/2014 | Phan ..................... A63F 13/285 340/407.1 |
| 2016/0073200 | A1 | 3/2016 | Yoo et al. |
| 2018/0350339 | A1 | 12/2018 | Macours et al. |

FOREIGN PATENT DOCUMENTS

| | | | |
|---|---|---|---|
| CN | 108989952 | A | 12/2018 |
| EP | 2806353 | A1 | 11/2014 |
| EP | 3409380 | A1 | 12/2018 |
| JP | 10-200977 | A | 7/1998 |
| JP | 2001-255993 | A | 9/2001 |
| JP | 2009-513077 | A | 3/2009 |
| JP | 2010-258807 | A | 11/2010 |
| JP | 2012-105147 | A | 5/2012 |
| JP | WO 2013/084958 | * | 6/2013 |
| JP | 2014-239430 | A | 12/2014 |
| JP | 2016-202486 | A | 12/2016 |
| JP | 2017-043602 | A | 3/2017 |
| KR | 10-2008-0071560 | A | 8/2008 |
| KR | 10-2014-0138087 | A | 12/2014 |
| KR | 10-1570299 | B1 | 11/2015 |
| WO | 2007/047960 | A2 | 4/2007 |
| WO | 2013/084958 | A1 | 6/2013 |
| WO | 2016/035927 | A1 | 3/2016 |

* cited by examiner

CONTROL APPARATUS, LOUDSPEAKER APPARATUS, AND AUDIO OUTPUT METHOD

CROSS REFERENCE TO RELATED APPLICATIONS

This application is a U.S. National Phase of International Patent Application No. PCT/JP2020/031969 filed on Aug. 25, 2020, which claims priority benefit of Japanese Patent Application No. JP 2019-160508 filed in the Japan Patent Office on Sep. 3, 2019. Each of the above-referenced applications is hereby incorporated herein by reference in its entirety.

TECHNICAL FIELD

The present technology relates to a control apparatus for controlling an audio output apparatus having a tactile presentation function, to a loudspeaker apparatus, and to an audio output method.

BACKGROUND ART

In recent years, applications of stimulating the sense of touch via human skin or the like through a tactile reproduction device have been utilized in various scenes.

As tactile reproduction devices therefor, eccentric rotating mass (ERM), linear resonant actuator (LRA), and the like have been currently widely used, and devices with a resonant frequency that is a frequency (about several 100 Hz) that provides good sensitivity for the human sense of touch have been widely used for them (e.g., see Patent Literature 1).

Since the frequency band that provides high sensitivity for the human sense of touch is several 100 Hz, vibration reproduction devices that handle this band of several 100 Hz have been mainstream.

As other tactile reproduction devices, an electrostatic tactile display and a surface acoustic wave tactile display aiming at controlling a friction coefficient of a touched portion and realizing a desired tactile sense have been proposed (e.g., see Patent Literature 2). In addition, an airborne ultrasonic tactile display utilizing an acoustic radiation pressure of converged ultrasonic waves and an electrotactile display that electrically stimulates nerves and muscles that are connected to a tactile receptor have been proposed.

For applications utilizing those devices, especially for music listening, a vibration reproduction device is built in a headphone casing to reproduce vibration at the same time as music reproduction, to thereby emphasize bass sound.

Moreover, wearable speakers that do not take the form of headphones and are used hanging around a neck have been proposed. The wearable speakers include one (e.g., see Patent Literature 3) that transmits vibration to a user from the back together with sound output from the speaker by utilizing their contact with a user's body and one (e.g., see Patent Literature 4) that transmits vibration to a user by utilizing a resonance of a back pressure of speaker vibration.

CITATION LIST

Patent Literature

Patent Literature 1: Japanese Patent Application Laid-open No. 2016-202486

Patent Literature 2: Japanese Patent Application Laid-open No. 2001-255993

Patent Literature 3: Japanese Patent Application Laid-open No. HEI 10-200977

Patent Literature 4: Japanese Patent Application No. 2017-43602

DISCLOSURE OF INVENTION

Technical Problem

Headphones and wearable (neck) speakers that perform tactile presentation can interfere with music listening because noise associated with vibration of vibrators provided for tactile presentation or driving of other tactile presentation devices reaches user's ears. Although noise that reaches ears can be reduced through a wearable speaker structure by some degree, noise having a frequency that provides higher sensitivity for human ears is generated, for example, in a case where vibration has higher frequency components for expressing a variety of tactile senses.

In view of the above-mentioned circumstances, the present technology has been made to provide a control apparatus, a loudspeaker apparatus, and an audio output method, by which noise from a tactile presentation device can be reduced.

Solution to Problem

A control apparatus according to an embodiment of the present technology includes a tactile control section and an audio control section.

The tactile control section generates, on the basis of a tactile signal for tactile presentation, a tactile control signal for driving a tactile presentation unit.

The audio control section generates, on the basis of a first audio signal and a second audio signal, an audio control signal for driving an audio output unit, the second audio signal containing sound components that are in an opposite phase to sound generated on the basis of the tactile signal and generated from the tactile presentation unit.

The audio control section may generate the audio control signal by adding the second audio signal to the first audio signal.

The control apparatus may further include a cancellation signal generation section that generates the second audio signal on the basis of the tactile signal.

The control apparatus may generate the audio control section generates a first signal for driving a first audio output unit that reproduces the first audio signal, and the cancellation signal generation section may generate a second signal for driving a second audio output unit that reproduces the second audio signal.

The cancellation signal generation section may generate the second audio signal on the basis of a frequency response characteristic of the audio output unit, a frequency response characteristic of the tactile presentation unit, and a transform function from vibration generated at the tactile presentation unit into sound.

A loudspeaker apparatus according to an embodiment of the present technology includes a tactile presentation unit, an audio output unit, a tactile control section, and an audio control section.

The tactile control section generates, on the basis of a tactile signal for tactile presentation, a tactile control signal for driving the tactile presentation unit.

The audio control section generates, on the basis of a first audio signal and a second audio signal, an audio control signal for driving the audio output unit, the second audio signal containing sound components that are in an opposite phase to sound generated on the basis of the tactile signal and generated from the tactile presentation unit.

The loudspeaker apparatus may further include a storage section that stores the tactile signal and the first audio signal.

The loudspeaker apparatus may further include a communication section that is capable of communicating with a server that stores the tactile signal and the first audio signal.

The audio output unit may include a common loudspeaker unit that reproduces the first audio signal and the second audio signal.

The audio output unit may include a first loudspeaker unit that reproduces the first audio signal and a second loudspeaker unit that reproduces the second audio signal.

The audio output unit may include a right loudspeaker and a left loudspeaker, and the loudspeaker apparatus may further include a coupler for hanging around a neck, the coupler coupling the right loudspeaker with the left loudspeaker.

The tactile presentation unit may include a vibration device.

Alternatively, the tactile presentation unit may include an ultrasonic wave generator, an electrical muscle stimulator, or an air flow generator.

An audio output method according to an embodiment of the present technology acquires a tactile signal for tactile presentation and a first audio signal. A tactile signal for tactile presentation and a first audio signal are acquired. A tactile control signal for driving a tactile presentation unit is generated on the basis of the tactile signal. A second audio signal containing sound components in an opposite phase to sound generated from the tactile presentation unit on the basis of the tactile signal is generated. An audio control signal for driving an audio output unit is generated on the basis of the first audio signal and the second audio signal.

MODE(S) FOR CARRYING OUT THE INVENTION

Hereinafter, each of embodiments according to the present technology will be described with reference to the drawings.

First Embodiment (Basic Configuration of Loudspeaker Apparatus)

Figure 1:
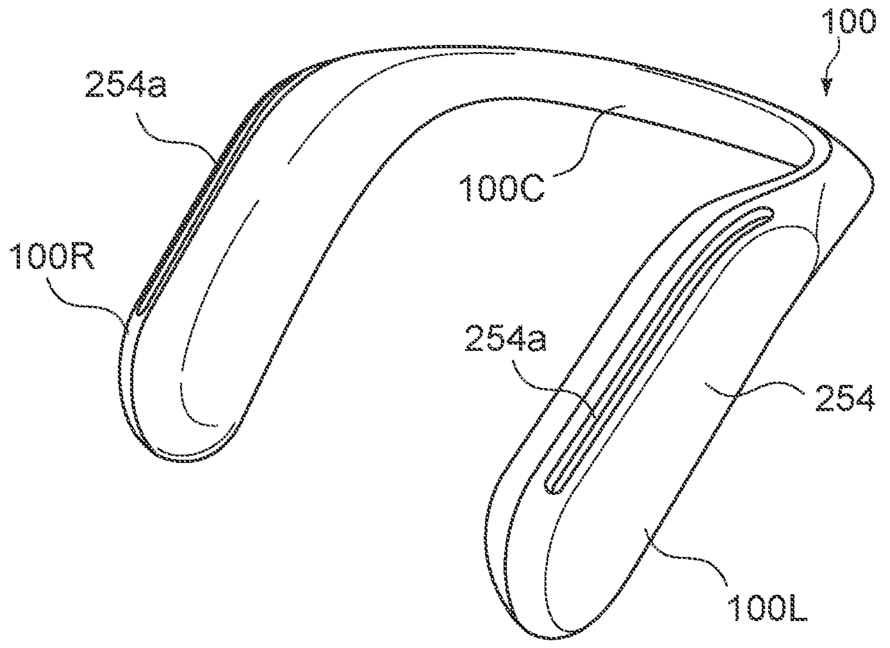
FIG. 1 A perspective view of a loudspeaker apparatus in a first embodiment of the present technology.
Figure 2:
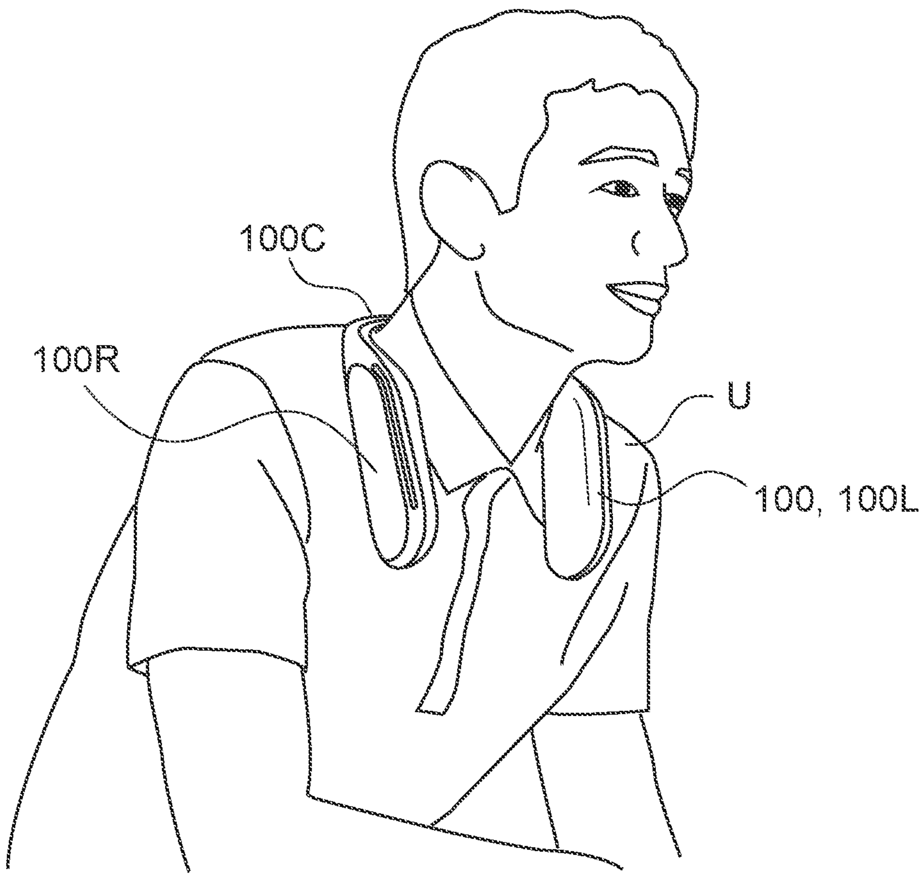
FIG. 2 A perspective view showing a state in which the loudspeaker apparatus is mounted on a user.

FIG. 1 is a perspective view showing a configuration example of a loudspeaker apparatus in an embodiment of the present technology. This loudspeaker apparatus (audio output apparatus) 100 has a function of actively presenting a tactile sense (vibration or the like) to a user U at the same time as sound. As shown in FIG. 2, the loudspeaker apparatus 100 is, for example, a wearable speaker that is mounted on both shoulders of the user U.

The loudspeaker apparatus 100 includes a right loudspeaker 100R, a left loudspeaker 100L, and a coupler 100C that couples the right loudspeaker 100R with the left loudspeaker 100L. The coupler 100C is formed in an arbitrary shape capable of hanging around the neck of the user U, and the right loudspeaker 100R and the left loudspeaker 100L are positioned on both shoulders or upper portions of the chest of the user U.

Figure 3:
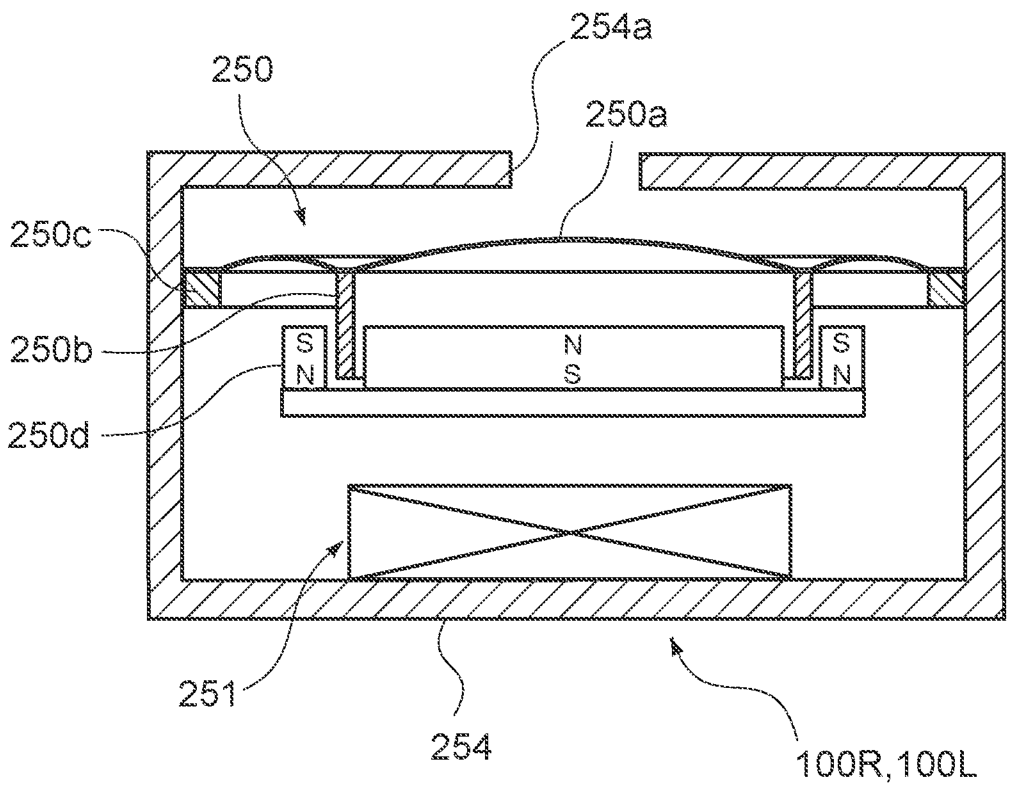
FIG. 3 A schematic cross-sectional view of main parts of the loudspeaker apparatus.

FIG. 3 is a schematic cross-sectional view of main parts of the right loudspeaker 100R and the left loudspeaker 100L of the loudspeaker apparatus 100 in FIGS. 1 and 2. The right loudspeaker 100R and the left loudspeaker 100L typically have a left-right symmetric structure. It should be noted that FIG. 3 is merely a schematic view, and therefore it is not equivalent to the shape and dimension ratio of the loudspeaker shown in FIGS. 1 and 2.

The right loudspeaker 100R and the left loudspeaker 100L include, for example, audio output units 250, tactile presentation units 251, and casings 254 that house them. The right loudspeaker 100R and the left loudspeaker 100L typically reproduce audio signals by a stereo method. Reproduction sound is not particularly limited as long as it is reproducible sound or voice that is typically a musical piece, a conversation, a sound effect, or the like.

The audio output units 250 are electroacoustic conversion-type dynamic speakers. The audio output units 250 includes a diaphragm 250*a*, a voice coil 250*b* wound around the center portion of the diaphragm 250*a*, a fixation ring 250*c* that retains the diaphragm 250*a* to the casing 254, and a magnet assembly 250*d* arranged facing the diaphragm 250*a*. The voice coil 250*b* is arranged perpendicular to a direction of a magnetic flux produced in the magnet assembly 250*d*. When an audio signal (alternate current) is supplied into the voice coil 250*b*, the diaphragm 250*a* vibrates due to electromagnetic force that acts on the voice coil 250*b*. By the diaphragm 250*a* vibrating in accordance with the signal waveform of the audio signal, reproduction sound waves are generated.

The tactile presentation unit 251 includes a vibration device (vibrator) capable of generating tactile vibration, such as an eccentric rotating mass (ERM), a linear resonant actuator (LRA), and a piezoelectric element. The tactile presentation unit 251 is driven when a tactile signal for tactile presentation prepared in addition to a reproduction signal is input. The amplitude and frequency of the vibration are also not particularly limited. The tactile presentation unit 251 is not limited to a case where it is constituted by the single vibration device, and the tactile presentation unit 251 may be constituted by a plurality of vibration devices. In this case, the plurality of vibration devices may be driven at the same time or may be driven individually.

The casing 254 has an opening potion (sound input port) 254*a* for passing audio output (reproduction sound) to the outside, in a surface opposite to the diaphragm 250*a* of the audio output unit 250. The opening potion 254*a* is formed in a straight line shape to conform to a longitudinal direction of the casing 254 as shown in FIG. 1, though not limited thereto. The opening potion 254*a* may be constituted by a plurality of through-holes or the like.

The tactile presentation unit 251 is, for example, arranged on an inner surface on a side opposite to the opening potion 254*a* of the casing 254. The tactile presentation unit 251 presents tactile vibration to the user via the casing 254. In order to improve the transmissivity of tactile vibration, the casing 254 may be partially constituted by a relatively low rigidity material. The shape of the casing 254 is not limited to the shape shown in the figure, and an appropriate shape such as a disk-shape and a rectangular parallelepiped-shape can be employed.

Figure 4:
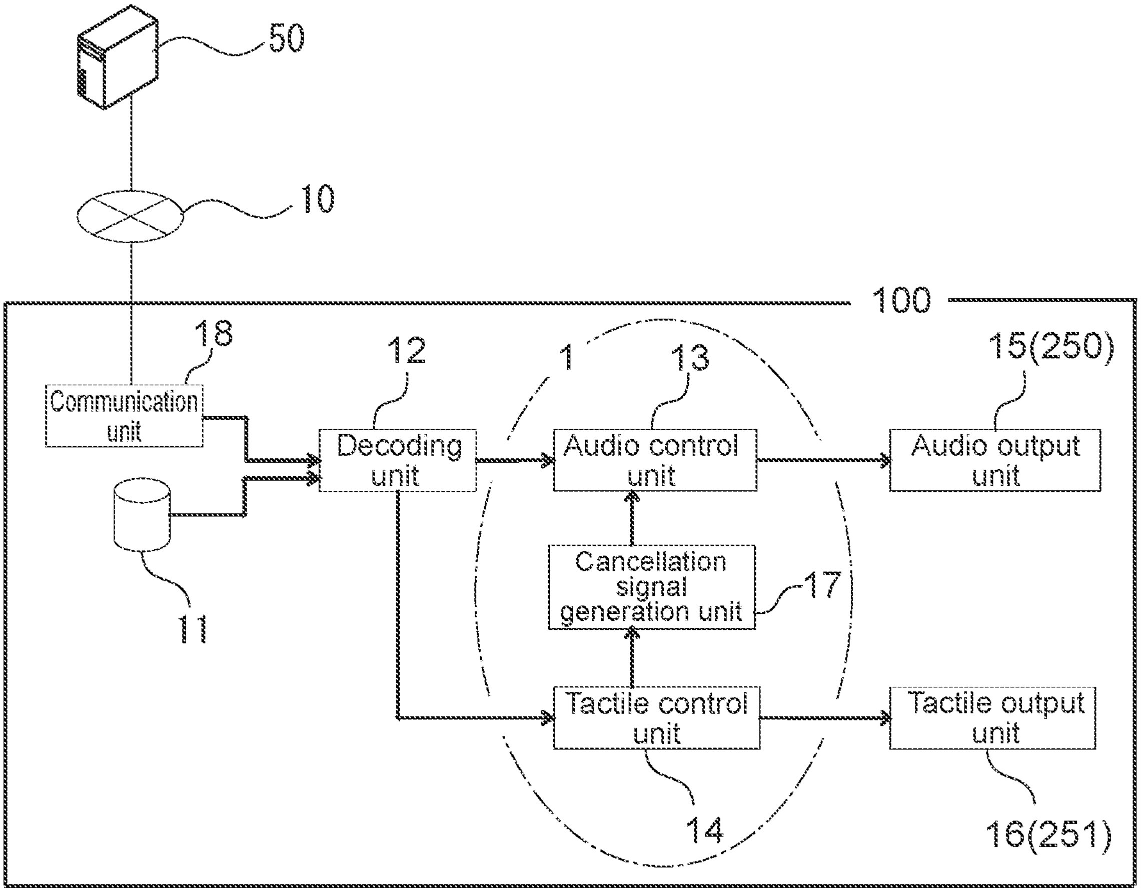
FIG. 4 A block diagram showing a configuration example of the loudspeaker apparatus.

Next, a control system of the loudspeaker apparatus 100 will be described. FIG. 4 is a block diagram showing a configuration example of the loudspeaker apparatus applied in this embodiment.

The loudspeaker apparatus 100 includes a control apparatus 1 that controls driving of the audio output units 250 and the tactile presentation units 251 of the right loudspeaker 100R and the left loudspeaker 100L. The control apparatus 1 and other elements to be described later are built in the casing 254 of the right loudspeaker 100R or the left loudspeaker 100L. Alternatively, the control apparatus 1 may be configured as an external apparatus connected to the right loudspeaker 100R and the left loudspeaker 100L with a wire or wirelessly.

As shown in FIG. 3, the control apparatus 1 includes an audio control section 13, a tactile control section 14, and a cancellation signal generation section 17.

The control apparatus 1 can be realized by hardware components used in a computer, such as a central processing unit (CPU), a random access memory (RAM), and a read only memory (ROM), and necessary software. Instead of or in addition to the CPU, a programmable logic device (PLD) such as a field programmable gate array (FPGA) or a digital signal processor (DSP) or other application specific integrated circuit (ASIC) and the like may be used. The control apparatus 1 executes a predetermined program, such that the audio control section 13, the tactile control section 14, and the cancellation signal generation section 17 are configured as functional blocks.

The loudspeaker apparatus 100 includes storage (storage section) 11, a decoding section 12, an audio output section 15, a tactile output section 16, and a communication section 18 as other hardware.

On the basis of the tactile signal for tactile presentation, the tactile control section 14 generates a tactile control signal for driving the tactile output section 16. The tactile signal is, as will be described later, data for tactile presentation (tactile data) stored in the storage 11 or an external server device 50 such as a cloud server. The tactile output section 16 includes the tactile presentation unit 251 shown in FIG. 3.

On the basis of a first audio signal and a second audio signal, the audio control section 13 generates an audio control signal for driving the audio output section 15. In this embodiment, the audio control section 13 generates the audio control signal by adding the second audio signal to the first audio signal.

Here, the first audio signal is an audio signal of a musical piece or the like. The second audio signal is an audio signal that is generated on the basis of the tactile signal and includes sound components that are in an opposite phase to sound generated from the tactile output section 16. The first audio signal is data for audio reproduction (audio data) stored in the storage 11 or the server device 50. Moreover, the second audio signal is equivalent to a cancellation signal for cancelling the sound generated at the time of driving the tactile output section 16 and is generated by the cancellation signal generation section 17.

The cancellation signal generation section 17 is configured to be capable of generating the second audio signal on the basis of the tactile signal. The tactile signal is data for tactile presentation (vibration data) stored in the storage 11 or the server device 50. In this embodiment, the second audio signal is configured to be generated in the cancellation signal generation section 17, though not limited thereto. The second audio signal may be stored in the storage 11 or the server device 50 together with the first audio signal and the tactile signal.

The storage 11 is a storage device capable of storing the first audio signal and the tactile signal, such as a nonvolatile semiconductor memory. In this embodiment, the first audio signal and the tactile signal are stored in the storage 11 as digital data encoded as appropriate.

The decoding section 12 decodes the first audio signal and the tactile signal stored in the storage 11. The decoding section 12 may be configured as a functional block that forms a part of the control apparatus 1.

The communication section 18 is constituted by a communication module connectable to a network 10 with a wire or wirelessly. The communication section 18 is configured to be capable of communicating with the server device 50 via the network 10 and capable of acquiring the first audio signal and the tactile signal stored in the server device 50.

The audio output section 15 includes the audio output units 250 of the right loudspeaker 100R and the left loudspeaker 100L shown in FIG. 3, for example.

The tactile output section 16 includes the tactile presentation units 251 shown in FIG. 3, for example.

(Operation of Loudspeaker Apparatus)

Next, a typical operation of the loudspeaker apparatus 100 configured in the above-mentioned manner will be described.

The control apparatus 1 acquires digital signals (first audio signal and tactile signal) for outputting sound and a tactile sense by receiving the digital signals from the server device 50 or reading the digital signals from the storage 11.

Next, the decoding section 12 performs suitable decoding processing on the acquired data to thereby take out audio data (first audio signal) and tactile data (tactile signal), and inputs the audio data (first audio signal) and the tactile data (tactile signal) into the audio control section 13 and the tactile control section 14, respectively.

The audio control section 13 and the tactile control section 14 performs various types of processing on the input data. Output (audio control signal) of the audio control section 13 is input into the audio output section 15 and output (tactile control signal) of the tactile control section 14 is input into the tactile output section 16. The audio output section 15 and the tactile output section 16 each include a D/A converter, a signal amplifier, and a reproduction apparatus (equivalent to the audio output units 250 and the tactile presentation units 251). The D/A converter and the signal amplifier may be included in the audio control section 13 and the tactile control section 14. The signal amplifier may include a volume control section that is controlled by the user U.

The tactile control section 14 sends the tactile data to the cancellation signal generation section 17. The cancellation signal generation section 17 generates a cancellation signal (second audio signal) for cancelling noise output from the tactile output section 16 and sends the cancellation signal to the audio control section 13. The cancellation signal includes sound components that are generated on the basis of the tactile data and are in an opposite phase to the sound (noise) generated from the tactile output section 16. A method of generating the cancellation signal will be described later in detail.

On the basis of the input tactile data, the tactile control section 14 generates a tactile control signal for driving the tactile output section 16. On the basis of the input audio data and cancellation signal, the audio control section 13 generates an audio control signal for driving the audio output section 15. Accordingly, the audio output section 15 outputs reproduction sound that contains sound components for cancelling the sound (noise) generated from the tactile output section 16.

(Noise Cancellation Principle)

Next, the cancellation signal generated in the cancellation signal generation section 17 will be described. Here, a case of reproducing content including an audio signal and a vibration signal for presenting a tactile sense through a vibration speaker provided with a vibrator for tactile presentation, which is capable of being actively driven, and listening a musical piece with a vibration will be described.

Vibration transmitted to the user's body (skin) from the vibration speaker is vibration output from the vibrator driven in accordance with the vibration signal. On the other hand, sound that is transmitted to the user's ear from the vibration speaker is not only sound from the loudspeaker driven in accordance with the audio signal but also sound transformed from vibration of the vibrator driven in accordance with the vibration signal, i.e., the sum of both. Those components as the sound transformed from vibration, which are added to the sound from the loudspeaker, often interfere with the user's music experience as noise.

Figure 5:
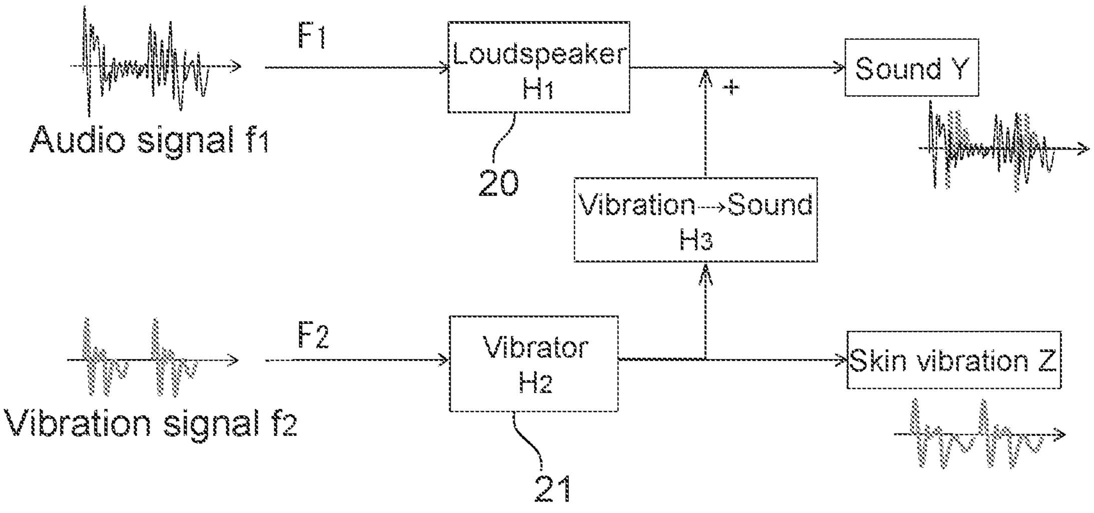
FIG. 5 A flow in which an audio signal and a vibration signal are transmitted as sound and vibration to the user's ears and skin.

FIG. 5 is an explanatory diagram of an operation of a loudspeaker apparatus without a noise cancellation function. Here, a flow in which an audio signal and a vibration signal are transformed into sound and vibration and transmitted to the user's ears and skin is shown.

As shown in FIG. 5, for example, with respect to a Fourier transform $F_1$ of an audio signal $f_1$, sound Y output from a loudspeaker section 20 is a signal multiplied by a frequency response characteristic $H_1$ of the loudspeaker section 20 (hereinafter, assuming that the signal is a signal subjected to Fourier transform unless specifically stated otherwise).

On the other hand, with respect to a Fourier transform $F_2$ of a vibration signal $f_2$, vibration Z output from a vibrator 21 is a signal multiplied by a frequency response characteristic $H_2$ of the vibrator 21, and it is transmitted to the skin as the vibration Z. In addition, sound subjected to transform (transform function $H_3$) from vibration into sound is generated from the vibrator 21 and is transmitted to the user's ear.

Thus, the sound Y that reaches the ears of the user U is as follows:

$$Y=H_1F_1+H_3H_2F_2. \quad \text{[Expression 1]}$$

The frequency response characteristic $H_1$ of the loudspeaker section 20 is, for example, a frequency response characteristic of the loudspeaker section 20 itself or one obtained by multiplying this frequency response characteristic by a gain or the like of a signal amplifier provided on the previous stage of the loudspeaker section 20.

The frequency response characteristic $H_2$ of the vibrator 21 is also defined similar to the frequency response characteristic $H_1$ of the loudspeaker section 20. The transform function $H_3$ from vibration into sound is, for example, defined as a function (characteristic) based on mechanical structure and arrangement of the vibrator 21.

Figure 6:
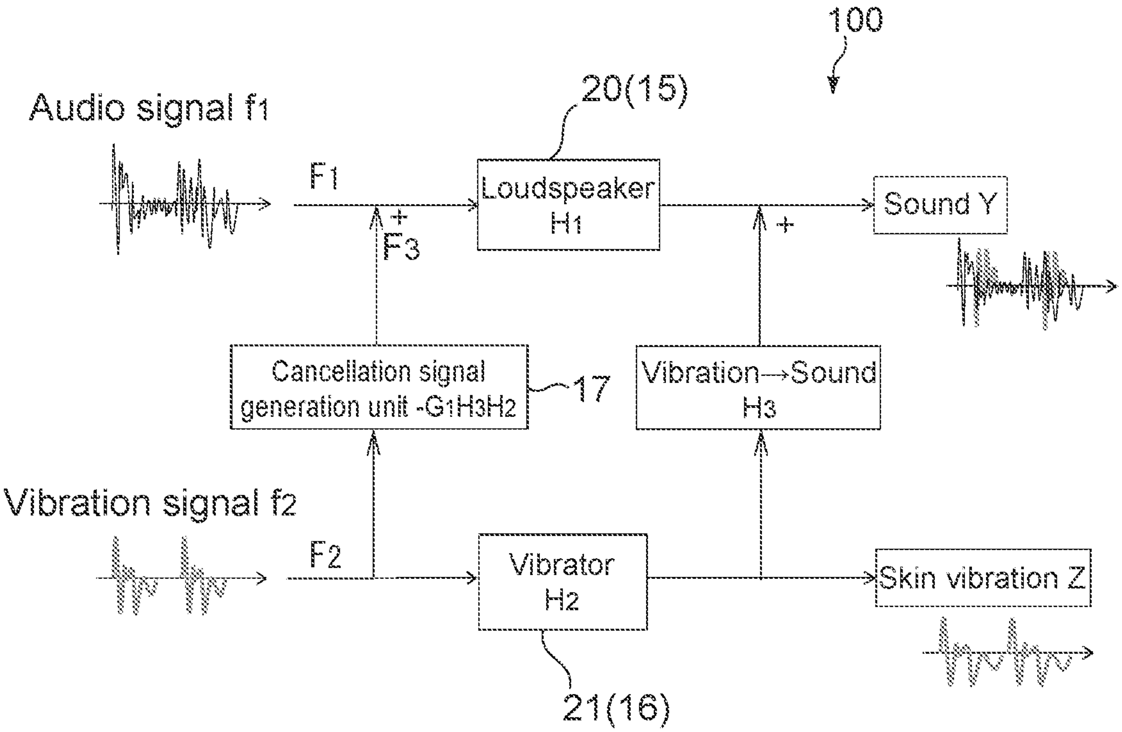
FIG. 6 An explanatory diagram of an operation of the loudspeaker apparatus.

On the other hand, FIG. 6 is an explanatory diagram of an operation of the loudspeaker apparatus 100 in this embodiment with the noise cancellation function. As shown in FIG. 6, the vibration signal $f_2$ output from the tactile control section 14 is sent to the cancellation signal generation section 17, and a cancellation signal $F_3$ is generated at the cancellation signal generation section 17 and sent to the audio control section 13. The cancellation signal $F_3$ is generated using the above-mentioned respective characteristics $H_1$, $H_2$, and $H_3$. Here, the respective characteristics $H_1$, $H_2$, and $H_3$ may be known values as long as they are well-known characteristics. Alternatively, the respective characteristics $H_1$, $H_2$, and $H_3$ may be values determined in previous measurement for each loudspeaker apparatus 100 as a test before shipment.

The audio control section 13 that has received the cancellation signal $F_3$ adds the cancellation signal $F_3$ to the audio signal $f_1$, sends it to the loudspeaker section 20 (audio output section 15), and sound is output at the loudspeaker section 20. The cancellation signal $F_3$ is generated to cancel only sound of sound that reaches the ears of the user U, which is generated from the vibrator 21. As a result, the user U is able to perceive the vibration Z output from the vibrator 21 (tactile output section 16) as it is, and to listen sound with the noise sound generated from the vibrator 21 cancelled.

Figure 7:
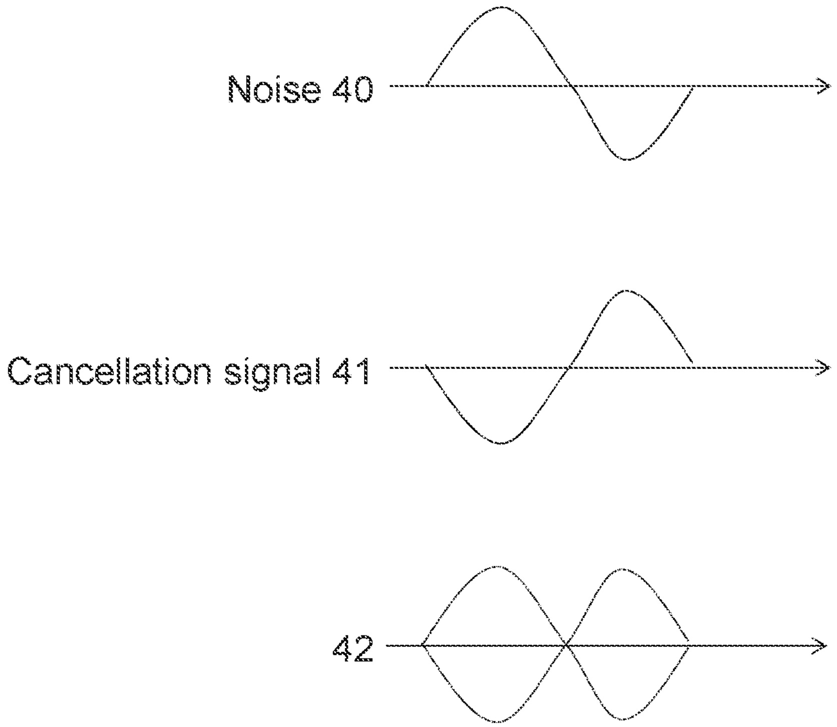
FIG. 7 An image diagram showing a basic principle of noise cancellation.

In FIG. 7, a basic principle of noise cancellation with a cancellation signal will be described. With respect to noise 40 that is not wished to be perceived by the user U, a cancellation signal 41 is generated such that a signal 42 obtained by adding the noise 40 and the cancellation signal 41 is lowest. Such a cancellation signal 41 is typically a signal that generates sound having the same amplitude as the waveform of the noise 40 and an inverted phase. The cancellation signal 41 is set in units of dB, for example.

(Specific Example of Noise Cancellation)

Hereinafter, processing for cancelling sound noise will be described specifically.

It is desirable that the cancellation signal $F_3$ be sound having the inverted phase with respect to the sound noise from the vibrator 21 when the cancellation signal $F_3$ is output from the loudspeaker section 20.

Thus, in order to generate the cancellation signal $F_3$ from the vibration signal $f_2$, it is sufficient to estimate sound ($H_3$ $H_2$ $F_2$) generated from the vibrator 21 in view of the frequency response characteristic $H_2$ of the vibrator 21 itself and the transform function $H_3$ from vibration of the vibrator 21 into sound and then overcome the frequency response characteristic $H_1$ of the loudspeaker section 20.

Accordingly, as the generated cancellation signal $F_3$ is expressed by a formula, it is $G_1$ $H_3$ $H_2$ $F_2$. Here, $G_1$ is a frequency response characteristic having an inverse characteristic that can overcome the characteristic of the frequency response characteristic $H_1$ of the loudspeaker section 20.

Information regarding the respective characteristics $H_1$, $H_2$, and $H_3$ is essential for calculating this cancellation signal $F_3$, and therefore it is necessary to measure them in advance. Known methods represented by a method of identifying characteristics of acoustic apparatuses and the like are used for this measurement method.

Moreover, envisaging a situation where this loudspeaker apparatus 100 is worn by the user U, the transform function $H_3$ from vibration into sound is desirably measured in a state in which the loudspeaker apparatus 100 is worn by a mannequin, a subject, or the like.

The calculation processing of this cancellation signal $F_3$ can be realized by multiplication of the respective frequency response characteristics $G_1$, $H_3$, $H_2$, and $F_2$ subjected to Fourier transform, for example. Alternatively, the calculation processing of this cancellation signal $F_3$ may be realized by the vibration signal $f_2$ and the inverse Fourier transform of the frequency response characteristics $G_1$, $H_3$, $H_2$, i.e., convolution of impulse responses $g_1$, $h_3$, $h_2$ of each system. Alternatively, the calculation processing of this cancellation signal $F_3$ may be realized by implementing a filter having a characteristic $(-G_1\ H_3\ H_2)$ in the cancellation signal generation section 17 as hardware.

A technology (ANC: active noise control) in which a vibration speaker provided with a microphone senses sound from a vibrator through the microphone and utilizes the sensing signal as a cancellation signal has also been known. However, in this embodiment, a highly accurate noise cancellation function can be realized by feed-forward control utilizing a vibration signal that is input into the tactile output section 16 without such a microphone. It is because a structural device to prevent noise from the tactile output section 16 from reaching the ears of the user U can be made in the loudspeaker apparatus 100, sound noise from the tactile output section 16, which is measured in advance, can be predicted by some degree unlike environment noise including random noise wished to be cancelled, and the like.

Therefore, in accordance with the loudspeaker apparatus 100 of this embodiment, since a microphone for noise sensing is unnecessary, the apparatus configuration can be simplified or a reduction in size can be achieved. Moreover, by utilizing a buffered vibration signal before output from the network 10 or the storage 11, noise can be cancelled without any delay as the feed-forward control.

Since the tactile output section 16 is configured as a unit separated from the audio output section 15 in the loudspeaker apparatus 100 of this embodiment, the degree of freedom in the design of the tactile output section 16 increases, and a variety of tactile vibrations can be presented to the user. In addition, since the cancellation signal $F_3$ is reproduced in synchronization with driving of the tactile output section 16, noise associated with driving of the tactile output section 16 can be effectively removed. In addition, content to present a tactile sense at a timing different from that of output sound from the audio output section 15 or in a band wider than that of sound can also be reproduced.

For sensitivity control in the loudspeaker apparatus 100, the audio output section 15 may be provided with a single limiter that sets a maximum value of the cancellation signal or a plurality of limiters of weak/middle/strong, for example, in units of dB, for example. Accordingly, the user U him or herself is able to select a noise cancellation level.

Figure 8:
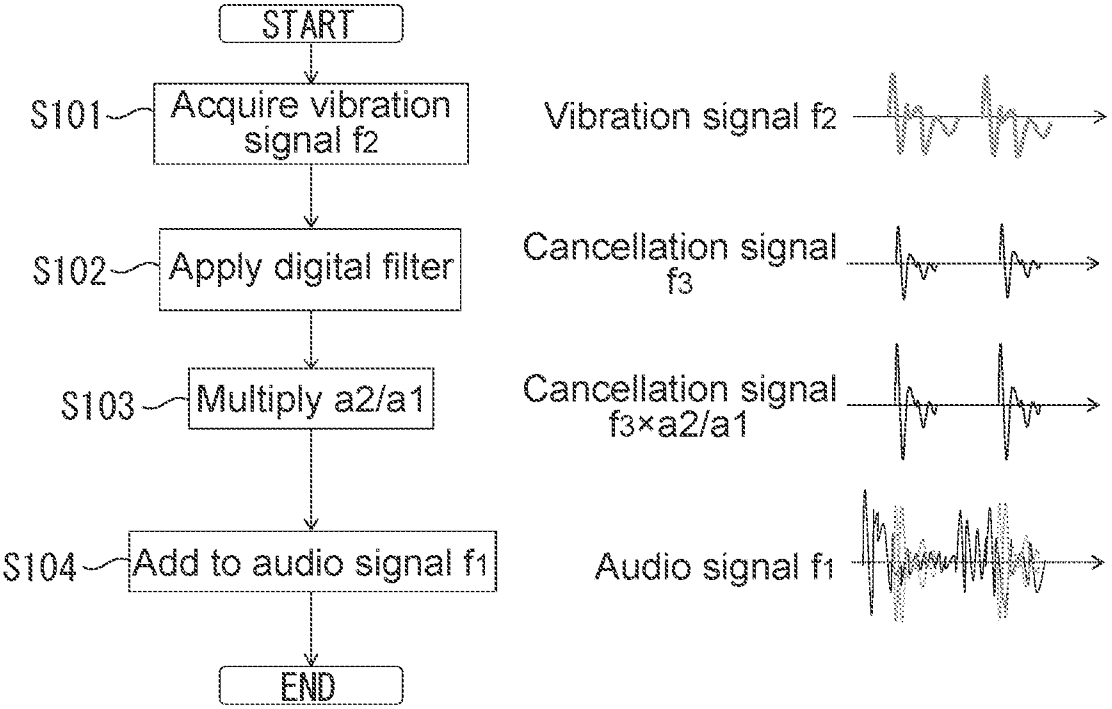
FIG. 8 A flow showing a processing procedure of generating a cancellation signal from a vibration signal for tactile presentation.

FIG. 8 shows a flow of processing of the cancellation signal generation section 17 that generates a cancellation signal from the vibration signal $f_2$, using the known frequency response characteristic $H_2$ of the vibrator 21, the known transform function $H_3$ from vibration into sound, and the known frequency response characteristic $H_1$ of the loudspeaker section 20, and the audio control section 13. Here, as an example, the cancellation signal is generated by digital signal processing using a filter having a frequency response characteristic $(-G_1\ H_3\ H_2)$.

As shown in FIG. 8, first of all, in Step S101, the cancellation signal generation section 17 acquires the vibration signal $f_2$ that should be reproduced from the tactile control section 14. Subsequently, in Step S102, the cancellation signal generation section 17 applies a digital filter having a frequency response characteristic of the coefficients $(-G_1\ H_3\ H_2)$ measured and recorded with respect to the vibration signal $f_2$ in advance. Accordingly, a cancellation signal $F_3$ (second audio signal) is generated.

The audio control section 13 adds this cancellation signal $F_3$ to an audio signal $f_1$ (first audio signal), to thereby generate an audio control signal for driving the audio output section 15. At this time, an amplification scale to be applied to each of the audio signal $f_1$ and the vibration signal $f_2$ at the time of reproduction may be considered. For example, in a case of amplifying the audio signal $f_1$ by $a_1$ times, amplifying the vibration signal $f_2$ by $a_2$ times, and outputting them to the loudspeaker section 20 and the vibrator 21, respectively, the cancellation signal generation section 17 receives information about those amplification scales from the audio control section 13 and the tactile control section 14 and multiplies the cancellation signal $F_3$ by their amplification ratio $(a_2/a_1)$ in Step S103.

Subsequently, in Step S104, the audio control section 13 generates the audio control signal by adding the cancellation signal $(f_3 \times (a_2/a_1))$ multiplied by the amplification ratio to a sound signal $f_1$. Accordingly, the sound Y whose noise is not perceived by the user U is output from the audio output section 15.

In the above description, the vibrator 21 has been exemplified as the tactile presentation device (tactile presentation units 251) in the tactile output section 16. The vibrator 21 can be similarly applied to tactile presentation devices other than the vibrator (e.g., an airborne ultrasonic wave generator, an electrical muscle stimulator, an air flow generator, and the like).

Second Embodiment

Next, a second embodiment of the present technology will be described.

In the above-mentioned first embodiment, the audio output section 15 (audio output units 250) is configured such that the audio signal (first audio signal) and the cancellation signal (second audio signal) are reproduced through the common loudspeaker unit (loudspeaker section 20). In this regards, in this embodiment, the audio signal (first audio signal) and the cancellation signal (second audio signal) are configured to be reproduced through separate loudspeakers, respectively.

Figure 9:
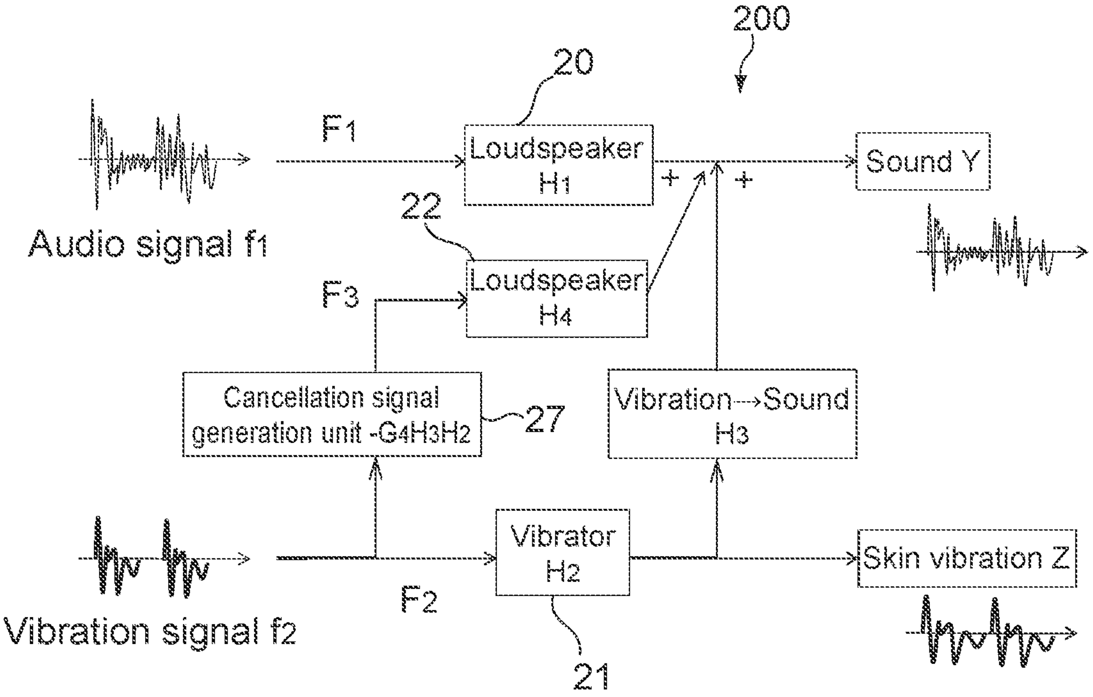
FIG. 9 A block diagram showing a loudspeaker apparatus in a second embodiment of the present technology.

FIG. 9 is an explanatory diagram of an operation of a loudspeaker apparatus 200 in the second embodiment of the present technology. The loudspeaker apparatus 200 of this embodiment further includes a loudspeaker section 22 (second audio output unit, second loudspeaker) that reproduces a cancellation signal $F_3$ as a second signal in addition to the loudspeaker section 20 (first audio output unit, first loudspeaker) that reproduces an audio signal $f_1$ as a first signal.

In this embodiment, a cancellation signal generation section 27 outputs, to the loudspeaker section 22, a control signal for reproducing the cancellation signal $F_3$ from a loudspeaker section 22. Assuming that a frequency response characteristic having an inverse characteristic that can overcome a frequency response characteristic $H_4$ of the loudspeaker section 22 is denoted by $G_4$, the cancellation signal $F_3$ is represented by the expression of $(-G_4 H_3 H_2 F_2)$. Accordingly, synthesized sound of reproduction sound of the audio signal $f_1$ output from the loudspeaker section 20 and reproduction sound of the cancellation signal $F_3$ output from the loudspeaker section 22 is presented to the user U. As a result, sound from the vibrator 21 can be cancelled.

Also in this embodiment, action and effect similar to those of the first embodiment can be obtained. In particular, in accordance with this embodiment, since the loudspeaker section 22 that reproduces the cancellation signal $F_3$ can be configured with specifications different from that of the loudspeaker section 20 that reproduces the audio signal $f_1$, the degree of freedom of the design of each loudspeaker section 20, 22 can increase.

Third Embodiment

Although the descriptions have been given exemplifying the case where the tactile output section 16 is the vibration device (vibrator 21) in each of the above-mentioned embodiments, a case where the tactile output section 16 is a tactile presentation device other than the vibration device will be described in this embodiment.

Examples of the tactile presentation device other than the vibration device can include one (air flow generator) that sends an air flow toward the user U by driving of a diaphragm, one (ultrasonic wave generator) that provides an acoustic radiation pressure with an ultrasonic wave array focused on the body of the user U, and one (electrical muscle stimulator) that directly stimulates a tactile receptor or muscle of the user U by electric stimulation. In other words, the tactile presentation device may be other devices not aiming at directly vibrating skin along with the vibration.

Figure 10:
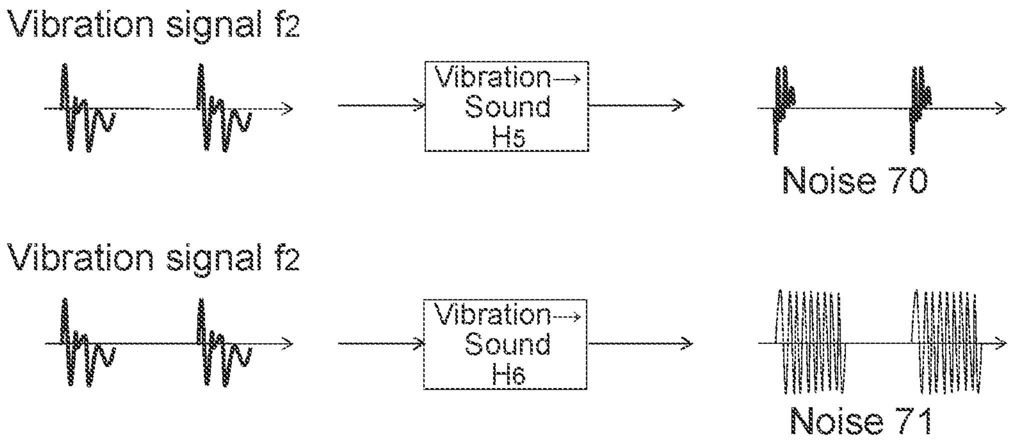
FIG. 10 A diagram showing a state in which noise is generated from a vibration signal for tactile presentation.

Also in those tactile presentation devices, noise sound can be generated along with driving of the tactile presentation devices and interfere with music listening in many cases. In view of this, the noise sound is cancelled by generating a cancellation signal with characteristics of each device and outputting the cancellation signal from the loudspeaker. Regarding a transform function from driving of the tactile presentation device into sound, as shown in FIG. 10, a case where it is a function $H_5$ having a particular frequency response characteristic similar to the vibration device can be exemplified as an example, and a case where it is a non-linear function $H_6$ that constantly outputs a signal having fixed amplitude and frequency in a driving interval (period) can be exemplified as another example. In a case where the transform function is $H_5$, sound noise 70 on a mode shown in the upper part of FIG. 10 is generated from the vibration signal $f_2$, and in a case where the transform coefficient is $H_6$, sound noise 71 shown in the lower part of FIG. 10 is generated from the signal $f_2$. Although sound noise behaviors may greatly differ, the flow and principle of the noise cancellation processing are similar to those of FIGS. 6 and 7.

Figure 11:
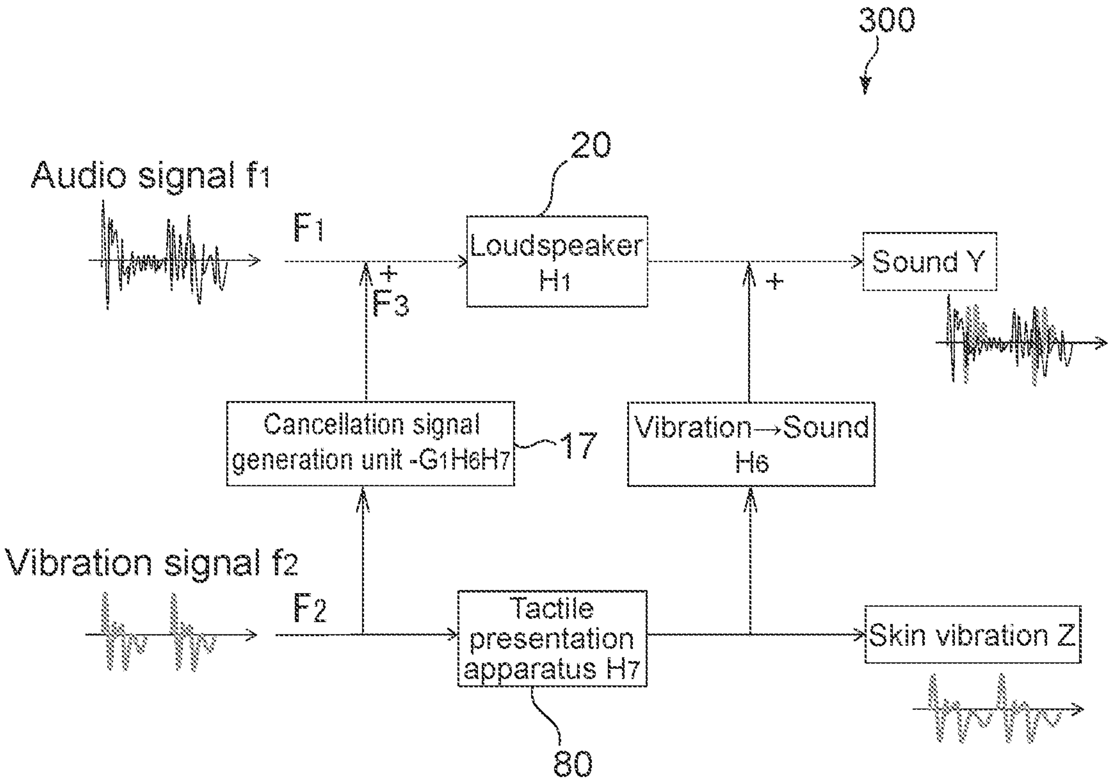
FIG. 11 A block diagram showing a loudspeaker apparatus in a third embodiment of the present technology.

FIG. 11 is an explanatory diagram of an operation of a loudspeaker apparatus 300 in this embodiment. In the figure, portions corresponding to those of the first embodiment (FIG. 6) will be denoted by the same reference signs and the detailed descriptions will be omitted.

In FIG. 11, a tactile presentation device 80 includes a tactile presentation device other than the vibration device. Here, assuming that the transform function from driving of the tactile presentation device 80 into sound is denoted by $H_6$ and the frequency response characteristic that the tactile presentation device has is denoted by $H_7$, the cancellation signal generation section 17 generates a cancellation signal $F_3$ having a characteristic represented by the expression of $(-G_1 H_6 H_7 F_2)$. Accordingly, the sound Y whose noise is not perceived by the user U is output from the loudspeaker section 20 (audio output section 15).

Modified Examples

For example, in each of the above-mentioned embodiments, the wearable loudspeaker apparatus used hanging around the user's neck has been described as an example of the loudspeaker apparatus, though not limited thereto. The present technology can also be applied to headphones or earphones that are mounted on the user's head. In this case, the tactile presentation unit may be configured as an apparatus different from the loudspeaker apparatus. In this case, the tactile presentation unit can be placed at any position, and therefore a tactile sense can be presented to a desired position of the user's body.

It should be noted that the present technology may also take the following configurations.

(1) A control apparatus, including:
- a tactile control section that generates, on the basis of a tactile signal for tactile presentation, a tactile control signal for driving a tactile presentation unit; and
- an audio control section that generates, on the basis of a first audio signal and a second audio signal, an audio control signal for driving an audio output unit, the second audio signal containing sound components that are in an opposite phase to sound generated on the basis of the tactile signal and generated from the tactile presentation unit.

(2) The control apparatus according to (1), in which
- the audio control section generates the audio control signal by adding the second audio signal to the first audio signal.

(3) The control apparatus according to (1) or (2), further including
- a cancellation signal generation section that generates the second audio signal on the basis of the tactile signal.

(4) The control apparatus according to (3), in which
- the audio control section generates a first signal for driving a first audio output unit that reproduces the first audio signal, and
- the cancellation signal generation section generates a second signal for driving a second audio output unit that reproduces the second audio signal.

(5) The control apparatus according to (3) or (4), in which
- the cancellation signal generation section generates the second audio signal on the basis of a frequency response characteristic of the audio output unit, a frequency response characteristic of the tactile presentation unit, and a transform function from vibration generated at the tactile presentation unit into sound.

(6) A loudspeaker apparatus, including:
- a tactile presentation unit;
- an audio output unit;
- a tactile control section that generates, on the basis of a tactile signal for tactile presentation, a tactile control signal for driving the tactile presentation unit; and
- an audio control section that generates, on the basis of a first audio signal and a second audio signal, an audio control signal for driving the audio output unit, the second audio signal containing sound components that are in an opposite phase to sound generated on the basis of the tactile signal and generated from the tactile presentation unit.

(7) The loudspeaker apparatus according to (6), further including a storage section that stores the tactile signal and the first audio signal.

(8) The loudspeaker apparatus according to (6) or (7), further including a communication section that is capable of communicating with a server that stores the tactile signal and the first audio signal.

(9) The loudspeaker apparatus according to any one of (6) to (8), in which the audio output unit includes a common loudspeaker unit that reproduces the first audio signal and the second audio signal.

(10) The loudspeaker apparatus according to any one of (6) to (8), in which the audio output unit includes a first loudspeaker unit that reproduces the first audio signal and a second loudspeaker unit that reproduces the second audio signal.

(11) The loudspeaker apparatus according to any one of (6) to (10), in which the audio output unit includes a right loudspeaker and a left loudspeaker, and the loudspeaker apparatus further includes a coupler for hanging around a neck, the coupler coupling the right loudspeaker with the left loudspeaker.

(12) The loudspeaker apparatus according to any one of (6) to (11), in which the tactile presentation unit includes a vibration device.

(13) The loudspeaker apparatus according to any one of (6) to (11), in which the tactile presentation unit includes an ultrasonic wave, myoelectricity, or an air flow.

(14) An audio output method, including:

acquiring a tactile signal for tactile presentation and a first audio signal;

generating, on the basis of the tactile signal, a tactile control signal for driving a tactile presentation unit;

generating a second audio signal containing sound components in an opposite phase to sound generated from the tactile presentation unit on the basis of the tactile signal; and generating, on the basis of the first audio signal and the second audio signal, an audio control signal for driving an audio output unit.

REFERENCE SIGNS LIST

1 control apparatus
10 external network
11 storage
12 decoding section
13 audio control section
14 tactile control section
15 audio output section
16 tactile output section
17, 27 cancellation signal generation section
20, 22 loudspeaker section
21 vibrator
80 tactile presentation device
100, 200, 300 loudspeaker apparatus
100C coupler
100L left loudspeaker
100R right loudspeaker

The invention claimed is:

1. A control apparatus, comprising:

a tactile control section configured to:

receive a tactile signal for tactile presentation; and generate, based on the tactile signal for the tactile presentation, a tactile control signal to drive a tactile presentation unit;

an audio control section configured to receive a first audio signal; and a cancellation signal generation section configured to:

receive the tactile signal; and generate a second audio signal based on the tactile signal, a frequency response characteristic of a first audio output unit, a frequency response characteristic of the tactile presentation unit, and a transform function from vibration generated at the tactile presentation unit into sound, wherein the second audio signal includes a plurality of sound components that is in an opposite phase to the sound, the first audio output unit reproduces the first audio signal, and the audio control section is further configured to:

receive the second audio signal; and generate, based on the first audio signal and the second audio signal, an audio control signal to drive the first audio output unit.

2. The control apparatus according to claim 1, wherein the audio control section is further configured to add the second audio signal to the first audio signal to generate the audio control signal.

3. The control apparatus according to claim 1, wherein the audio control section is further configured to generate a first signal to drive the first audio output unit, and the cancellation signal generation section is further configured to generate a second signal to drive a second audio output unit, and the second audio output unit reproduces the second audio signal.

4. A loudspeaker apparatus, comprising:

a tactile presentation unit configured to generate vibrations, wherein the vibrations generate a sound;

an audio output unit configured to reproduce a first audio signal;

a tactile control section configured to:

receive a tactile signal for tactile presentation; and generate, based on the tactile signal for the tactile presentation, a tactile control signal to drive the tactile presentation unit;

a cancellation signal generation section configured to:

receive the tactile signal; and generate a second audio signal based on the tactile signal, a frequency response characteristic of the audio output unit, a frequency response characteristic of the tactile presentation unit, and a transform function from the vibration generated at the tactile presentation unit into the sound, wherein the second audio signal includes a plurality of sound components that is in an opposite phase to the sound; and an audio control section configured to:

receive the first audio signal and the second audio signal; and generate, based on the first audio signal and the second audio signal, an audio control signal to drive the audio output unit.

5. The loudspeaker apparatus according to claim 4, further comprising a storage section configured to store the tactile signal and the first audio signal.

6. The loudspeaker apparatus according to claim 4, further comprising a communication section configured to communicate with a server, wherein the server stores the tactile signal and the first audio signal.

7. The loudspeaker apparatus according to claim 4, wherein the audio output unit includes a common loudspeaker unit, the common loudspeaker unit is configured to reproduce the first audio signal and the second audio signal.

8. The loudspeaker apparatus according to claim 4, wherein the audio output unit includes:

a first loudspeaker unit configured to reproduce the first audio signal; and a second loudspeaker unit configured to reproduce the second audio signal.

9. The loudspeaker apparatus according to claim 4, wherein the audio output unit includes a right loudspeaker and a left loudspeaker, the loudspeaker apparatus further includes a coupler, and the coupler is configured to couple the right loudspeaker with the left loudspeaker.

10. The loudspeaker apparatus according to claim 4, wherein the tactile presentation unit includes a vibration device.

11. The loudspeaker apparatus according to claim 4, wherein the tactile presentation unit includes at least one of an ultrasonic wave generator, an electrical muscle stimulator, or an air flow generator.

12. An audio output method, comprising:

acquiring a tactile signal for tactile presentation and a first audio signal;

generating, based on the tactile signal, a tactile control signal for driving a tactile presentation unit;

generating a second audio signal based on the tactile signal, a frequency response characteristic of an audio output unit, a frequency response characteristic of the tactile presentation unit, and a transform function from vibration generated at the tactile presentation unit into sound, wherein the second audio signal includes a plurality of sound components that is in an opposite phase to the sound, and the audio output unit reproduces the first audio signal; and generating, based on the first audio signal and the second audio signal, an audio control signal for driving the audio output unit.

* * * * *